(12) United States Patent
Sato

(10) Patent No.: US 8,139,380 B2
(45) Date of Patent: Mar. 20, 2012

(54) FLYBACK SYSTEM POWER SOURCE APPARATUS FOR CONTROLLING A SYNCHRONOUSLY RECTIFYING ELEMENT

(75) Inventor: Takeshi Sato, Tama (JP)

(73) Assignee: Mitsumi Electric Co., Ltd., Tama-Shi (JP)

( * ) Notice: Subject to any disclaimer, the term of this patent is extended or adjusted under 35 U.S.C. 154(b) by 433 days.

(21) Appl. No.: 12/400,558

(22) Filed: Mar. 9, 2009

(65) Prior Publication Data

US 2009/0284989 A1   Nov. 19, 2009

(30) Foreign Application Priority Data

May 13, 2008  (JP) .................................. 2008-125438

(51) Int. Cl.
  *H02M 3/335* (2006.01)
(52) U.S. Cl. ........................ 363/21.14; 363/44; 363/89
(58) Field of Classification Search ............... 363/21.14, 363/39, 44, 89, 127
  See application file for complete search history.

(56) References Cited

U.S. PATENT DOCUMENTS

| | | | |
|---|---|---|---|
| 5,736,890 A | 4/1998 | Yee et al. | |
| 6,674,658 B2 * | 1/2004 | Mao et al. | 363/127 |
| 6,831,847 B2 * | 12/2004 | Perry | 363/21.06 |
| 7,092,260 B2 * | 8/2006 | Berghegger | 363/21.06 |
| 2009/0284989 A1 * | 11/2009 | Sato | 363/19 |
| 2011/0150521 A1 * | 6/2011 | Uchiyama et al. | 399/88 |

FOREIGN PATENT DOCUMENTS

JP      10-74936 A   3/1998

* cited by examiner

*Primary Examiner* — Jeffrey Sterrett
(74) *Attorney, Agent, or Firm* — Holtz, Holtz, Goodman & Chick, PC

(57) ABSTRACT

A flyback system power source apparatus, which applies a voltage intermittently to a primary winding of a transformer to perform voltage outputting onto a secondary winding side of the transformer, comprises: the transformer; a synchronously rectifying element for rectifying a current in a secondary winding of the transformer; and a synchronous rectification control circuit for detecting a voltage vibration caused in a terminal voltage of the secondary winding to perform operation control of the synchronously rectifying element on the basis of the detection.

3 Claims, 5 Drawing Sheets

FLYBACK SYSTEM POWER SOURCE APPARATUS FOR CONTROLLING A SYNCHRONOUSLY RECTIFYING ELEMENT

BACKGROUND OF THE INVENTION

1. Field of the Invention

The present invention relates to a flyback system power source apparatus including a synchronously rectifying element on the secondary side of a transformer.

2. Related Art

As shown in FIG. 4, there is generally a flyback system power source apparatus 50 provided with a synchronously rectifying element SW52 on the secondary side of a transformer T51. In the flyback system power source apparatus 50, if the synchronously rectifying element SW52 on the secondary side is turned on in an on-period of a switching element SW51 on the primary side, then output terminals are short-circuited to each other through a secondary winding N52 and the synchronously rectifying element SW52. Consequently, it is necessary to control the synchronously rectifying element SW52 lest the switching element SW51 on the primary side and the synchronously rectifying element SW52 should be simultaneously turned on. Moreover, there is also the situation such that it is impossible to supply the control signal on the primary side directly to the secondary side in order to insulate the primary side of the transformer T51 from the secondary side thereof.

As a conventional control method of a synchronously rectifying element, there is, for example, the method of detecting the polarity of the current flowing on the secondary side by a current transformer to switch the turning on and off of the synchronously rectifying element on the basis of the detection of the current polarity.

Moreover, as shown in FIG. 5, also the following method was proposed (see, for example, Japanese Patent Application Laid-Open Publication No. Hei 10-74936). The method inserted an inductor L51 in series with the synchronously rectifying element SW52, detected the polarity of the current flowing on the secondary side from the voltage between the both ends of the synchronously rectifying element SW52 and the inductor L51, and turned off the synchronously rectifying element SW52 if the characteristic of a forward current was detected or turned on the synchronously rectifying element SW52 if the characteristic of a reverse direction current was detected.

However, the aforesaid method of using the current transformer has the problem in which the configuration of the circuit for controlling the synchronously rectifying element is complicated and the number of parts is also large to make the circuit mounting area large.

Moreover, also the method of inserting the inductor L51 in series with the synchronously rectifying element SW52 has the problem of the necessity of the addition of the inductor L51 to increase the number of parts.

Moreover, the method of using the parasitic inductance that was caused in the synchronously rectifying element SW52 and wiring in place of the inductor L51 inserted in series with the synchronously rectifying element SW52 to detect the current polarity on the basis of the voltage between both the ends of the inductance component was considered, but the value of the parasitic inductance became very small in this case and consequently it was considered that the detection of the current polarity based on the voltage generated in the parasitic inductance was very difficult.

SUMMARY OF THE INVENTION

The present invention is directed to achieve the reduction of the number of parts and the decrease of the mounting area of the parts, and to enable the sure operation control of a synchronously rectifying element in synchronization with the switching of the operation on the primary side in a flyback system power source apparatus using the synchronously rectifying element on the secondary side thereof.

An aspect of the present invention is a flyback system power source apparatus, which applies a voltage intermittently to a primary winding of a transformer to perform voltage outputting onto a secondary winding side of the transformer, comprising: the transformer; a synchronously rectifying element for rectifying a current in a secondary winding of the transformer; and a synchronous rectification control circuit for detecting a voltage vibration caused in a terminal voltage of the secondary winding to perform operation control of the synchronously rectifying element on the basis of the detection.

BRIEF DESCRIPTION OF THE DRAWINGS

The above and other objects, advantages and features of the present invention will become more fully understood from the detailed description given below and the appended drawings, and the following descriptions pertain to the embodiment of the present invention are not intended to limit the present invention, and wherein.

DETAILED DESCRIPTION OF THE PREFERRED EMBODIMENTS

In the following, an embodiment of the present invention will be described with reference to the attached drawings.

Figure 1:
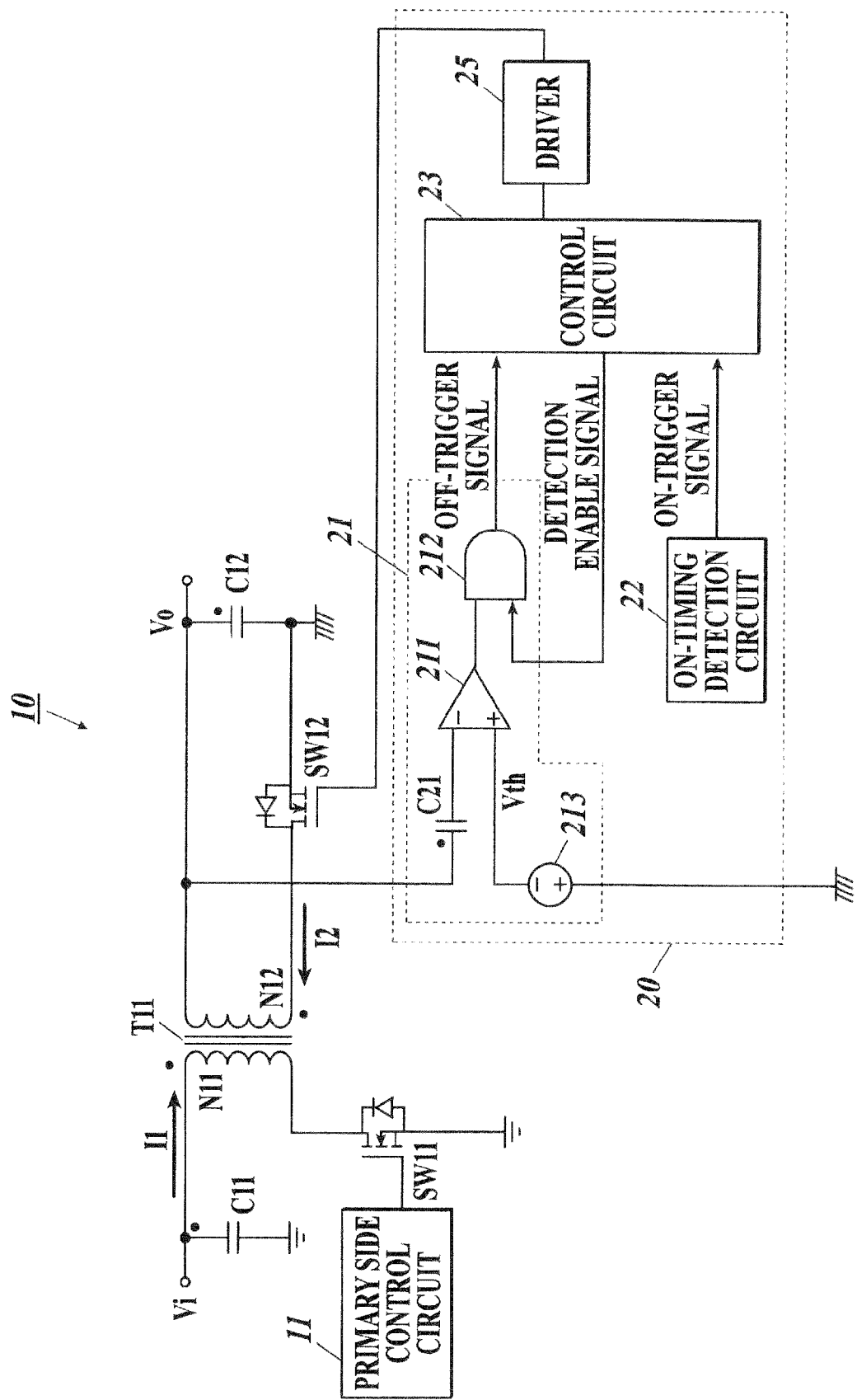
FIG. 1 is a configuration diagram showing a flyback system power source apparatus of an embodiment of the present invention.

FIG. 1 is a configuration diagram of a flyback system power source apparatus of the embodiment of the present invention.

The flyback system power source apparatus 10 of the present embodiment includes a flyback transformer T11, a switching element (for example, N channel power MOS FET) SW11, a primary side control circuit 11, a smoothing capacitor C11, a synchronously rectifying element (for example, N channel power MOS FET) SW12, a secondary side control circuit 20, a smoothing capacitor C12, and the like. The flyback transformer T11 is configured to be able to accumulate magnetic flux energy in the core thereof by inverting the polarities of the primary winding N11 thereof and the secondary winding N12 thereof from each other. The switching element SW11 applies and breaks an input voltage Vi to the primary winding N11. The primary side control circuit 11 controls the operation of the switching element SW11. The smoothing capacitor C11 smoothes the voltage on the input side. The synchronously rectifying element SW12 rectifies the current flowing through the secondary winding N12 into one direction. The secondary side control circuit 20 controls the synchronously rectifying element SW12. The smoothing capacitor C12 is connected between the output terminals.

The primary side control circuit 11 performs the on-off control of the switching element SW11 so as to enable predetermined voltage outputting by detecting the output voltage through, for example, a photo coupler or an auxiliary winding provided to the transformer T11, although the description of the details of the primary side control circuit 11 is omitted. As the primary side control circuit 11, a self-excited control circuit or an externally excited control circuit can be applied.

The secondary side control circuit 20 includes an off-timing detection circuit 21, an on-timing detection circuit 22, a control circuit 23, a driver 25, and the like. The off-timing detection circuit 21 detects the off-timing of the synchronously rectifying element SW12 The on-timing detection circuit 22 detects the on-timing of the synchronously rectifying element SW12. The control circuit 23 performs the on-off control of the synchronously rectifying element SW12 on the basis of the trigger signals output from both of the detection circuits 21 and 22. The driver 25 drives the gate terminal of the synchronously rectifying element SW12 on the basis of the output of the control circuit 23.

Although the description of the details of the on-timing detection circuit 22 is omitted, the on-timing detection circuit 22 can be configured so as to detect, for example, the voltage between both the ends of the synchronously rectifying element SW12 to output an on-trigger signal when a current flows through the body diode (parasitic diode) of the synchronously rectifying element SW12. When the primary side switching element SW11 is switched from the on-state thereof to the off-state thereof, the voltage between both the ends of the synchronously rectifying element SW12 changes from the state in which a reverse voltage is applied thereto to the state in which a forward current flows and a forward voltage of the body diode is generated. Accordingly, the on-timing detection circuit 22 can be configured to detect the change to output the on-trigger signal. In addition, various well-known techniques may be applied for the configuration to detect the on-timing.

The off-timing detection circuit 21 includes a DC cut capacitor C21, a reference voltage generation circuit 213, an analog comparator 211, a logic gate (for example, AND circuit) 212, and the like. The DC cut capacitor C21 removes the DC component of the terminal voltage of the secondary winding N12 of the transformer T11 from the terminal voltage. The reference voltage generation circuit 213 generates a predetermined threshold voltage Vth. The analog comparator 211 compares the signal passing through the DC cut capacitor C21 with the threshold voltage Vth. The logic gate 212 outputs the output of the comparator 211 to the control circuit 23 as an off-trigger signal only in a predetermined detection period.

The control circuit 23 makes the driver 25 perform high level outputting on the basis of the inputting of the on-trigger signal from the on-timing detection circuit 22, and on the other hand the control circuit 23 makes the driver 25 perform low level outputting on the basis of the inputting of the off-trigger signal from the off-timing detection circuit 21. Moreover, the control circuit 23 is configured to output a detection enable signal during a period in which the synchronously rectifying element SW12 is being on (the period in which the control circuit 23 makes the driver 25 be performing the high level outputting) and from which a predetermined minimum on-time T01 (see FIG. 3C) from the timing of switching the synchronously rectifying element SW12 to the on-state thereof is excluded, and to take in the output of the comparator 211 as the off-trigger signal.

Next, the operation of the power source apparatus 10 configured as described above will be described.

Figure 2:
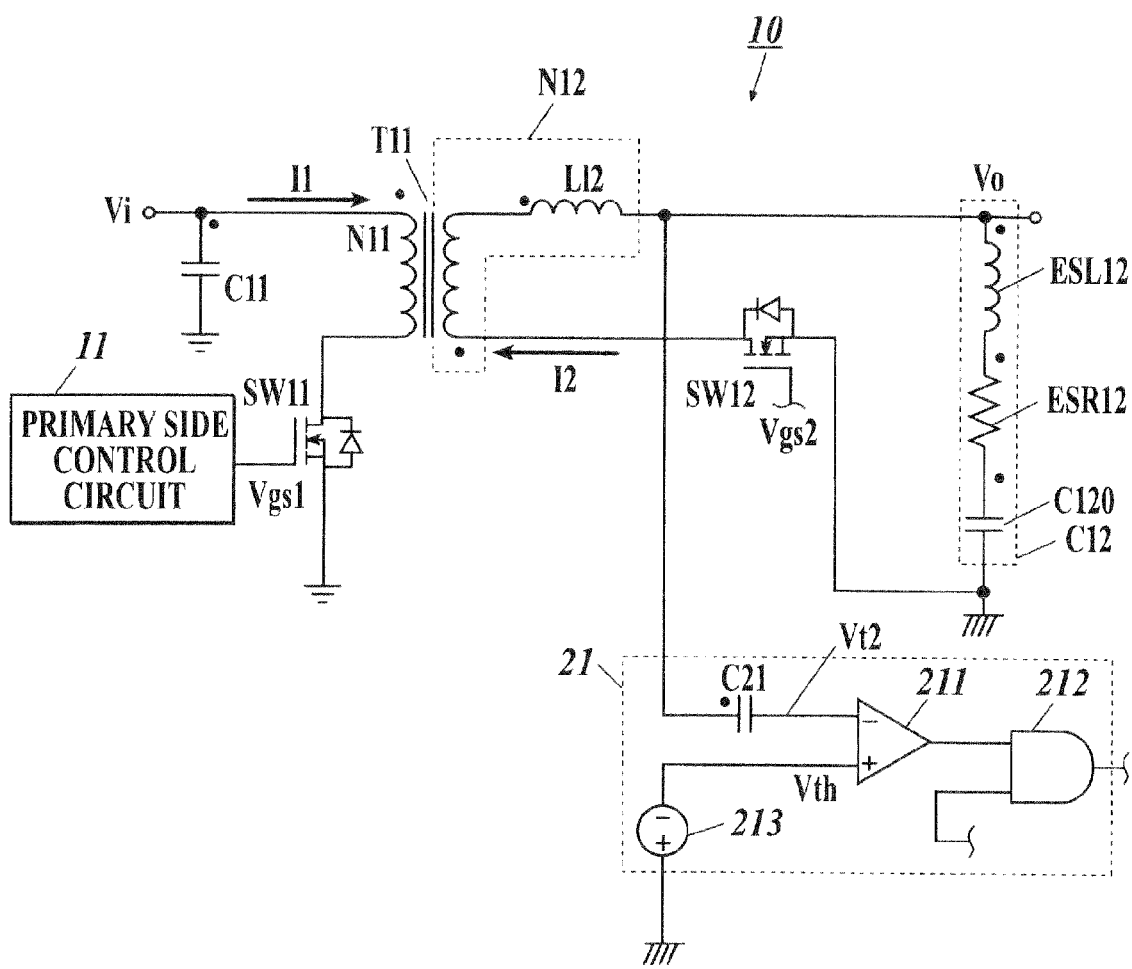
FIG. 2 is an equivalent circuit diagram showing parasitic components of the circuit of FIG. 1.

FIG. 2 shows a circuit diagram expressing the parasitic components of the circuit of FIG. 1 as equivalent circuits; and FIGS. 3A-3E show a timing chart for illustrating the operation of the power source apparatus 10.

Figures 3A, 3B, 3C, 3D, 3E:
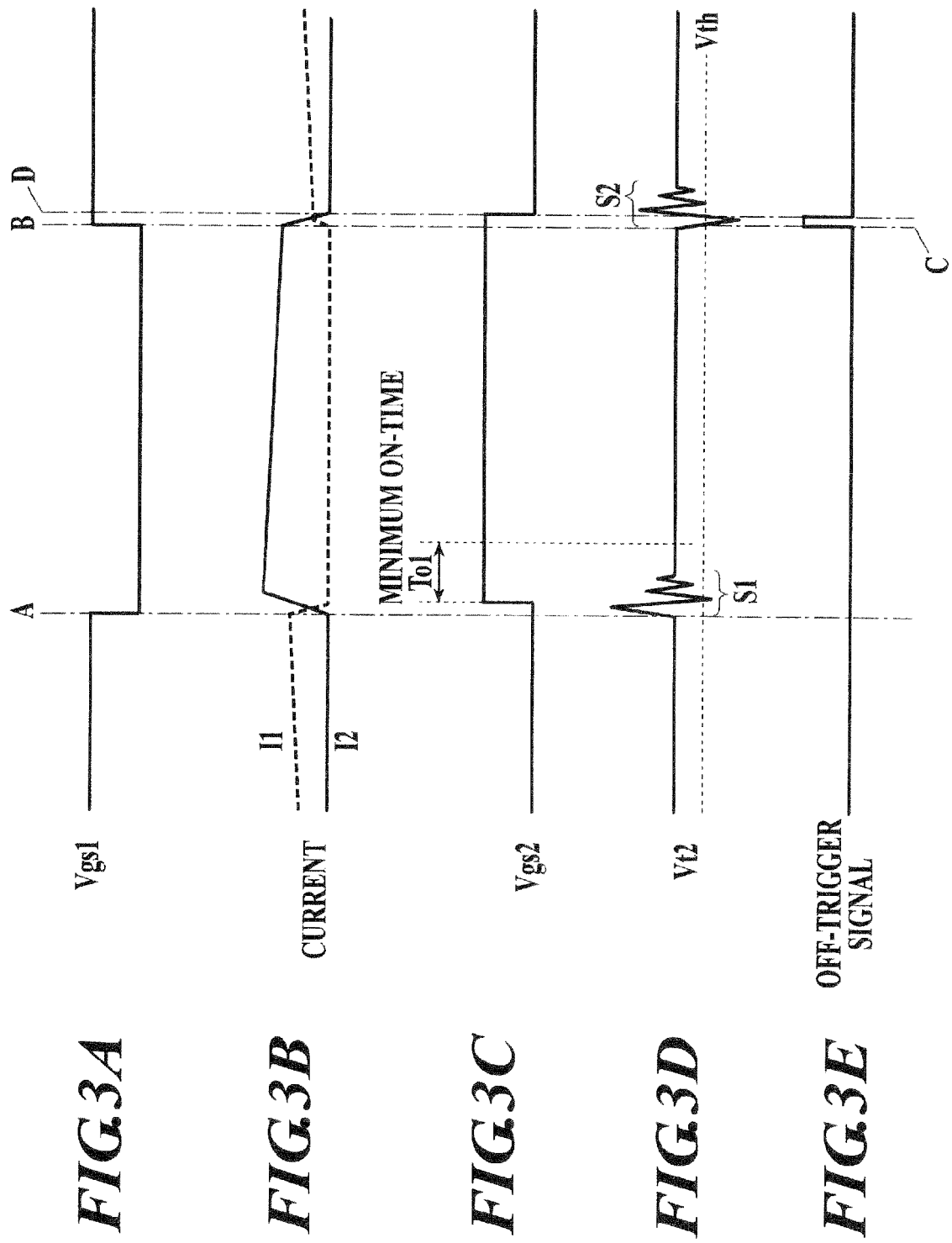
FIGS. 3A-3E are time charts each illustrating the operation of the circuit of FIG. 1.
Figure 4:
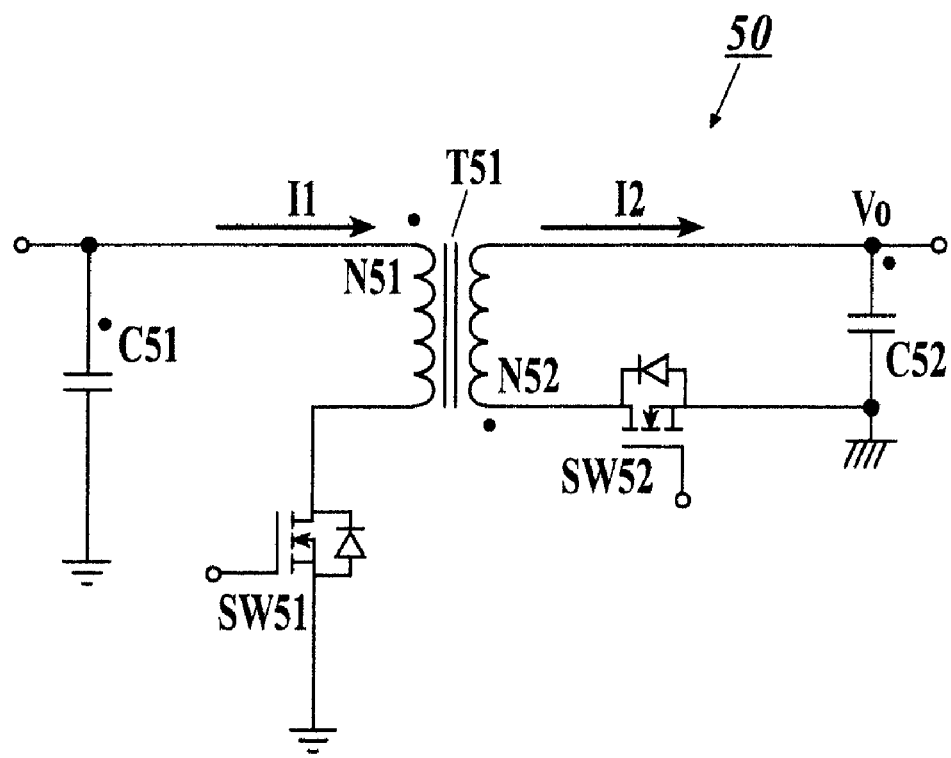
FIG. 4 is a circuit diagram showing the basic configuration of a conventional flyback system power source circuit.
Figure 5:
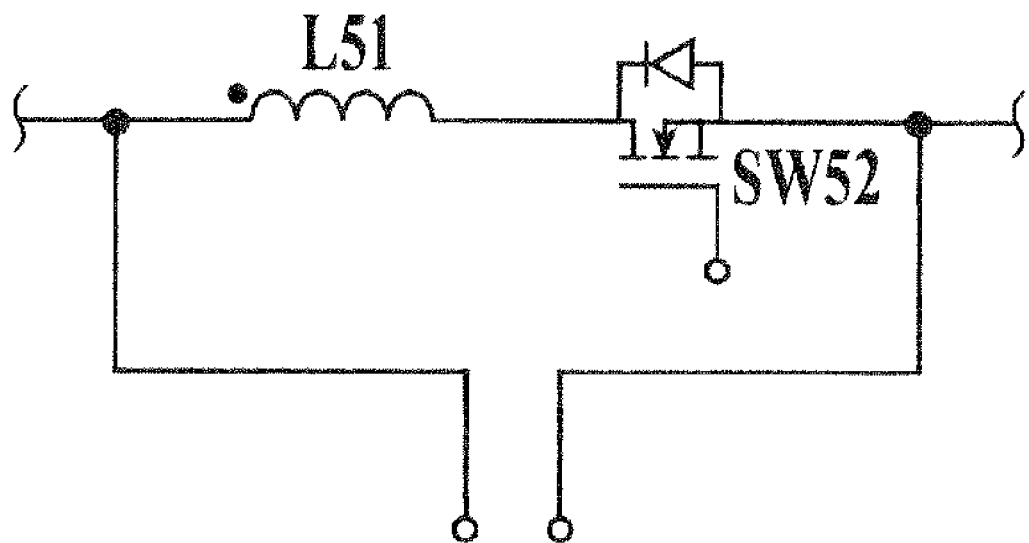
FIG. 5 is a circuit diagram for illustrating an example of the detecting method of the off-timing of a conventional synchronously rectifying element.

Among FIGS. 3A-3E, FIG. 3A shows a control signal Vgs1 (for example, gate-to-source voltage) of the switching element SW1 on the primary side; FIG. 3B shows a current I1 flowing through the primary winding N11 and a current I2 flowing through the secondary winding N12; FIG. 3C shows a control signal Vgs2 (for example, gate-to-source voltage) of the synchronously rectifying element SW12 on the secondary side; FIG. 3D shows a voltage Vt2 that has passed through the DC cut capacitor C21 in the off-timing detection circuit 21; and FIG. 3E shows the off-trigger signal output from the logic gate 212.

According to the power source apparatus 10 configured as described above, first, at timing A, at which the control signal Vgs1 of the switching element SW11 on the primary side is negated and the switching element SW11 is turned off, and at timing B, at which the control signal Vgs1 of the switching element SW11 is asserted and the switching element SW11 is turned on, the current I2 flowing through the secondary winding N12 rapidly increases from zero (at the timing A) and rapidly decreases (at the timing B), and the inclination of the temporal variation of the current I2 flowing through the secondary winding N12 ($d(I2)/d(t)$, where t denotes time) changes. Then, voltage vibrations S1 and S2 are generated between the terminals of the secondary winding N12 by the inclination changes of the current changes ($d(I2)/d(t)$).

The vibration voltages are generated by the parasitic components of the transformer T11 and the smoothing capacitor C12 as shown in FIG. 2. That is, the secondary winding N12 of the transformer T11 includes a leakage inductance L12, which is not coupled with the primary winding N11, by leakage fluxes. Moreover, in the smoothing capacitor C12, a series equivalent resistor ESR12 and a series equivalent inductance ESL12 are formed. Consequently, the occurrence of the changes of the inclination of the temporal variation of the current I2 generates an induced electromotive force in the leakage inductance L12. Then, the induced electromotive force is applied to the coupled circuit of the leakage inductance L12 and the smoothing capacitor C12 to vibrate the terminal voltage of the secondary winding N12 up and down.

To put it more concretely, the voltage between the terminals of the secondary winding N12 once greatly changes into the rising direction at the timing A, when the switching element SW11 on the primary side is switched to the off-state thereof, and after that, the voltage between the terminals performs an attenuation vibration. Moreover, the voltage between the terminals of the secondary winding N12 once greatly changes into the falling direction at the timing B, when the switching element SW11 on the primary side is switched to the on-state thereof, and after that, the voltage between the terminals performs another attenuation vibration.

In the off-timing detection circuit 21 of the secondary side control circuit 20, first, the voltage vibration S1 generated in the secondary winding N12 at the timing A passes through the DC cut capacitor C21 to be input into one of the input terminals of the comparator 211. Then, the voltage vibration S1 is compared with the threshold voltage Vth, which is set to be a negative voltage, in the comparator 211, and a detection signal is output from the comparator 211 when the voltage of the voltage vibration S1 is less than the threshold voltage Vth. However, since the timing when the detection signal is output is included in a period in which the synchronously rectifying element SW12 is being off or a period of the minimum on-time T01 just after the turning-on of the synchronously rectifying element SW12, the detection enable signal output from the control circuit 23 is in the state of being negated, and consequently no off-trigger signal is output.

On the other hand, when the switching element SW11 on the primary side is turned off at the timing A, then the on-timing detection circuit 22 in the secondary side control circuit 20 detects the turning-off, and the control signal Vgs2 of the synchronously rectifying element SW12 is asserted on the basis of the detection, so that the synchronously rectifying element SW12 is turned on. By such control, the power consumption in the synchronously rectifying element SW12 can be lessened more than that of the case of flowing a current through the diode, and more highly efficient voltage output can be realized.

Next, when the switching element SW11 on the primary side is turned on at the timing B, the voltage vibration S2 caused by the on-operation of the switching element SW11 passes through the DC cut capacitor C21 to be input into the input terminal on the one side of the comparator 211 at timing C slightly delayed from the timing B. Then, the input voltage vibration S2 is compared with the threshold voltage Vth, set to be the negative voltage, in the comparator 211, and a detection signal is output from the comparator 211 when the voltage of the voltage vibration S2 is less than the threshold voltage Vth, Furthermore, since the synchronously rectifying element SW12 is in its on-state at the timing C and the timing C is the timing after the elapse of the minimum on-time T01, the detection enable signal output from the control circuit 23 is asserted. Consequently, the detection signal of the comparator 211 passes through the logic gate 212 to be output to the control circuit 23 as an off-trigger signal.

When the off-trigger signal is output to the control circuit 23, a signal to turn off the synchronously rectifying element SW12 is output from the control circuit 23 on the basis of the off-trigger signal, and the synchronously rectifying element SW12 is turned off through the driver 25. Thereby, it can be prevented that the switching element SW11 on the primary side and the synchronously rectifying element SW12 are simultaneously turned on and a short circuit current flows through the secondary winding N12. Moreover, since the synchronously rectifying element SW12 is kept to be in its on-state until the timing D, which is the limit timing until which the short circuit current does not flow through the synchronously rectifying element SW12, the power consumption in the synchronously rectifying element SW12 becomes the minimum in comparison with that in the case where the synchronously rectifying element SW12 is turned off at the timing earlier than the timing D and the current I2 on the secondary side flows through the body diode, and consequently more highly efficient voltage outputting is realized.

Incidentally, the example of FIGS. 3A-3E shows the operation at the time of a current continuous mode in which the period in which both of the currents I1 and I2 flowing through the transformer T11 becomes zero is not produced. In the case of a current discontinuous mode, in which the period in which both of the currents I1 and I2 become zero is produced, the voltage vibration cased between the terminals of the secondary winding N12 when the switching element SW11 on the primary side is turned on becomes relatively small.

Accordingly, for example, a detection circuit to detect the fact that the current I2 flowing through the secondary winding N12 and the synchronously rectifying element SW12 becomes zero in the period during which the synchronously rectifying element SW12 is in its on-state may be provided in the secondary side control circuit 20, and the control of turning off the synchronously rectifying element SW12 may be performed on the basis of the detection of the detection circuit at the time of the current discontinuous mode. In such a configuration, the control of turning off the synchronously rectifying element SW12 on the basis of the voltage vibration S2 is performed only at the time of the current continuous mode.

As described, above, according to the flyback system power source apparatus 10 of the present embodiment, the voltage vibration of the secondary winding N12, which is caused by the turning-on of the switching element SW11 on the primary side, is detected, and thereby the control of turning off the synchronously rectifying element SW12 is performed. Consequently, the synchronously rectifying element SW12 can be surely turned off at the appropriate timing without increasing the number of parts and the mounting area of the parts. That is, the voltage vibration is generated by the induced electromotive force of the leakage inductance L12, which is generated in the secondary winding N12 of the transformer T11, and the comparatively large voltage vibration is generated because the inductance value of the leakage inductance L12 is comparatively large. Consequently, the detection is sure. Furthermore, since the leakage inductance L12 parasitic on the secondary winding N12 is utilized, it is unnecessary to insert a new current transformer or inductor for detecting the current polarity on the secondary side, and the reduction of the number of parts and the decrease of the mounting area can be achieved.

Moreover, since the embodiment is provided with the DC cut capacitor C21 to remove the DC component of the terminal voltage of the secondary winding N12 therefrom and the comparator 211 to compare the voltage passing through the capacitor C21 with the threshold voltage Vth as the off-timing detection circuit, the voltage vibrations caused in the terminal voltage of the secondary winding N12, in which voltage vibrations the voltage greatly changes, can be surely detected with the simple circuit configuration.

Incidentally, the present invention is not limited to the embodiment described above, but various changes and modifications can be performed. For example, although the example of using the voltage vibrations caused in the terminal voltage of the secondary winding N12 to generate the timing of turning off the synchronously rectifying element SW12 is shown in the embodiment described above, the voltage vibrations may be used for the generation of the timing of turning on the synchronously rectifying element SW12.

Moreover, although the example of using the N channel power MOS FETs as the switching element SW11 on the primary side and the synchronously rectifying element SW12 on the secondary side is shown in the embodiment described above, the MOS FETs can be changed to various power transistors. Moreover, both of the externally exited power source apparatus and the self-excited power source apparatus can be similarly applied as the power source apparatus of the present invention as long as the power source apparatus is a flyback system power source apparatus. In addition, the circuit configurations shown in the embodiment concretely can be suitably changed without departing from the spirit and scope of the present invention.

An aspect of the present invention is a flyback system power source apparatus, which applies a voltage intermittently to a primary winding of a transformer to perform voltage outputting onto a secondary winding side of the transformer, comprising:

the transformer;

a synchronously rectifying element for rectifying a current in a secondary winding of the transformer; and a synchronous rectification control circuit for detecting a voltage vibration caused in a terminal voltage of the secondary winding to perform operation control of the synchronously rectifying element on the basis of the detection.

To put it concretely, the synchronous rectification control circuit preferably includes a DC cut circuit to remove a direct-current component from the terminal voltage of the secondary winding, and a comparison circuit to compare a signal passing through the DC cut circuit with a threshold voltage, wherein an output of the comparison circuit is a trigger signal to turn off the synchronously rectifying element.

Moreover, to put it concretely, the synchronous rectification control circuit is preferably configured to detect the voltage vibration caused in a coupled circuit of a leakage inductance appearing in the secondary winding of the transformer and a smoothing capacitor connected onto an output terminal side, the voltage vibration caused by switching of an operation on a primary side of the transformer.

The synchronous rectification control circuit preferably performs the operation control of the synchronously rectifying element based on the detection of the voltage vibration at the time of a current continuous mode in which the current flowing through the transformer becomes continuous.

According to the present invention, when the current of the secondary winding suddenly changes at the time when the switching element on the primary side of the transformer is turned on or the like, induced electromotive force is generated in the leakage inductance (inductance component by a leakage flux) belonging to the secondary winding of the transformer, and a voltage vibration is generated between the terminals of the secondary winding of the transformer. Moreover, since the inductance value of the leakage inductance is larger than the parasitic inductance of a transistor or wiring, the voltage vibration becomes comparatively large. Accordingly, it is possible to surely control the synchronously rectifying element in synchronization with the switching timing of the operation on the primary side on the basis of the detection of the voltage vibration.

Moreover, according to the configuration of the invention, since no current transformer and no inductances connected in series with the synchronously rectifying element are needed for detecting the current polarity on the secondary side, the reduction of the number of parts and the decrease of the mounting area of the parts can be achieved.

The entire disclosure of Japanese Patent Applications No. 2008-125438 filed on May 13, 2008 including specifications, claims, drawings and summaries are incorporated herein by reference in their entirety.

What is claimed is:

1. A flyback system power source apparatus which applies a voltage intermittently to a primary winding of a transformer to perform voltage outputting onto a secondary winding side of the transformer, the apparatus comprising:
   the transformer;
   a synchronously rectifying element for rectifying a current in a secondary winding of the transformer; and
   a synchronous rectification control circuit for detecting a voltage vibration caused in a terminal voltage of the secondary winding to perform operation control of the synchronously rectifying element based on the detection;
   wherein the synchronous rectification control circuit comprises:
      a DC cut circuit for removing a direct-current component from the terminal voltage of the secondary winding; and
      a comparison circuit for comparing a signal that has passed through the DC cut circuit with a threshold voltage;
      wherein an output of the comparison circuit is a trigger signal to turn off the synchronously rectifying element.

2. The flyback system power source apparatus according to claim 1, wherein the synchronous rectification control circuit performs the operation control of the synchronously rectifying element based on the detection of the voltage vibration in a current continuous mode in which a current continuously flows through the transformer.

3. The flyback system power source apparatus according to claim 1, wherein the synchronous rectification control circuit detects the voltage vibration caused in a coupled circuit of a leakage inductance appearing in the secondary winding of the transformer and a smoothing capacitor connected to an output terminal side, the voltage vibration being caused by switching of an operation on a primary side of the transformer.

* * * * *